United States Patent
Lin

(10) Patent No.: US 9,118,475 B2
(45) Date of Patent: Aug. 25, 2015

(54) METHOD AND SYSTEM FOR DETECTING ENHANCED RELATIVE GRANTS IN A WIRELESS COMMUNICATIONS SYSTEM

(75) Inventor: Jamie Menjay Lin, San Marcos, CA (US)

(73) Assignee: Broadcom Corporation, Irvine, CA (US)

( * ) Notice: Subject to any disclaimer, the term of this patent is extended or adjusted under 35 U.S.C. 154(b) by 1202 days.

(21) Appl. No.: 12/615,741

(22) Filed: Nov. 10, 2009

(65) Prior Publication Data

US 2011/0110244 A1    May 12, 2011

(51) Int. Cl.
| | | |
|---|---|---|
| H04L 1/16 | (2006.01) | |
| H04B 17/327 | (2015.01) | |
| H04L 1/18 | (2006.01) | |
| H04W 24/00 | (2009.01) | |
| H04W 28/04 | (2009.01) | |

(52) U.S. Cl.
CPC ............ *H04L 1/1692* (2013.01); *H04B 17/327* (2015.01); *H04L 1/1812* (2013.01); *H04W 24/00* (2013.01); *H04W 28/04* (2013.01)

(58) Field of Classification Search
CPC .. H04B 17/327; H04L 1/1692; H04L 1/1812; H04W 24/00; H04W 28/04
USPC .......................................................... 370/252
See application file for complete search history.

(56) References Cited

U.S. PATENT DOCUMENTS

| | | | | |
|---|---|---|---|---|
| 2002/0021682 | A1* | 2/2002 | Ariyoshi et al. | 370/335 |
| 2004/0252670 | A1* | 12/2004 | Rong et al. | 370/343 |
| 2009/0325506 | A1* | 12/2009 | Nibe | 455/67.13 |
| 2011/0069631 | A1* | 3/2011 | Eder et al. | 370/252 |

OTHER PUBLICATIONS

HSUPA Concepts. Agilent. Jan. 15, 2009.*
Ghadialy Zahid. High Speed Uplink Packet Access (HSUPA): A Tutorial. Mar. 26, 2006.*

* cited by examiner

*Primary Examiner* — Huy D Vu
*Assistant Examiner* — Stephen J Clawson
(74) *Attorney, Agent, or Firm* — Sterne, Kessler, Goldstein & Fox P.L.L.C.

(57) ABSTRACT

Aspects of a method and system for detecting enhanced relative grants in a wireless communications system may include measuring a signal power level of an Enhanced Hybrid ARQ Indicator Channel (E-HICH) and estimating a HOLD signal level of an Enhanced Dedicated Channel (E-DCH) Relative Grant Channel (E-RGCH), based on the measured E-HICH signal power level, wherein the E-RGCH is associated with the E-HICH. The signal power level of the E-HICH in Transmission Time Intervals (TTIs) associated with the E-HICH may be measured. The HOLD signal level may be measured by compensating the measured signal power level of the E-HICH based on whether the E-HICH signal comprises an acknowledgment (ACK), a discontinuous transmission (DTX), or a negative acknowledgment (NACK). The measured signal power level may be compensated by an offset. An UP signal level of the E-RGCH signal may be estimated based on the estimated HOLD signal level.

20 Claims, 6 Drawing Sheets

METHOD AND SYSTEM FOR DETECTING ENHANCED RELATIVE GRANTS IN A WIRELESS COMMUNICATIONS SYSTEM

CROSS-REFERENCE TO RELATED APPLICATIONS/INCORPORATION BY REFERENCE

None.

FIELD OF THE INVENTION

Certain embodiments of the invention relate to signal processing for communication systems. More specifically, certain embodiments of the invention relate to a method and system for detecting enhanced relative grants in a wireless communications system.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third (3G) and fourth generation (4G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase throughput and, in turn, offer advanced QoS capabilities and speeds that rival those delivered by cable modem and/or DSL service providers. Recently, advances in multiple antenna technology and other physical layer technologies have started to significantly increase available communication data rates.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for detecting enhanced relative grants in a wireless communications system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for detecting enhanced relative grants in a wireless communications system. Aspects of the method and system for detecting enhanced relative grants in a wireless communications system may comprise measuring a signal power level of an Enhanced Hybrid ARQ Indicator Channel (E-HICH) and estimating a HOLD signal level of an Enhanced Dedicated Channel (E-DCH) Relative Grant Channel (E-RGCH), based on the measured E-HICH signal power level, wherein the E-RGCH is associated with the E-HICH. The signal power level of the E-HICH in Transmission Time Intervals (TTIs) associated with the E-HICH may be measured. The HOLD signal level may be measured by compensating the measured signal power level of the E-HICH based on whether the E-HICH signal comprises an acknowledgment (ACK), a discontinuous transmission (DTX), or a negative acknowledgment (NACK). The measured signal power level may be compensated by an offset. An UP signal level of the E-RGCH signal may be estimated based on the estimated HOLD signal level. A DOWN signal level of the E-RGCH signal may be estimated based on the estimated HOLD signal level. The communication signals may be High Speed Uplink Packet Access signals. The E-HICH and the E-EGRCH may use a same Orthogonal Variable Spreading Factor (OVSF) code. A plurality of E-HICH measurements may be averaged for the measurement of the signal power level of the E-HICH. The plurality of E-HICH measurements may be obtained in Transmission Time Intervals (TTIs) associated with the E-HICH.

Figure 1A:
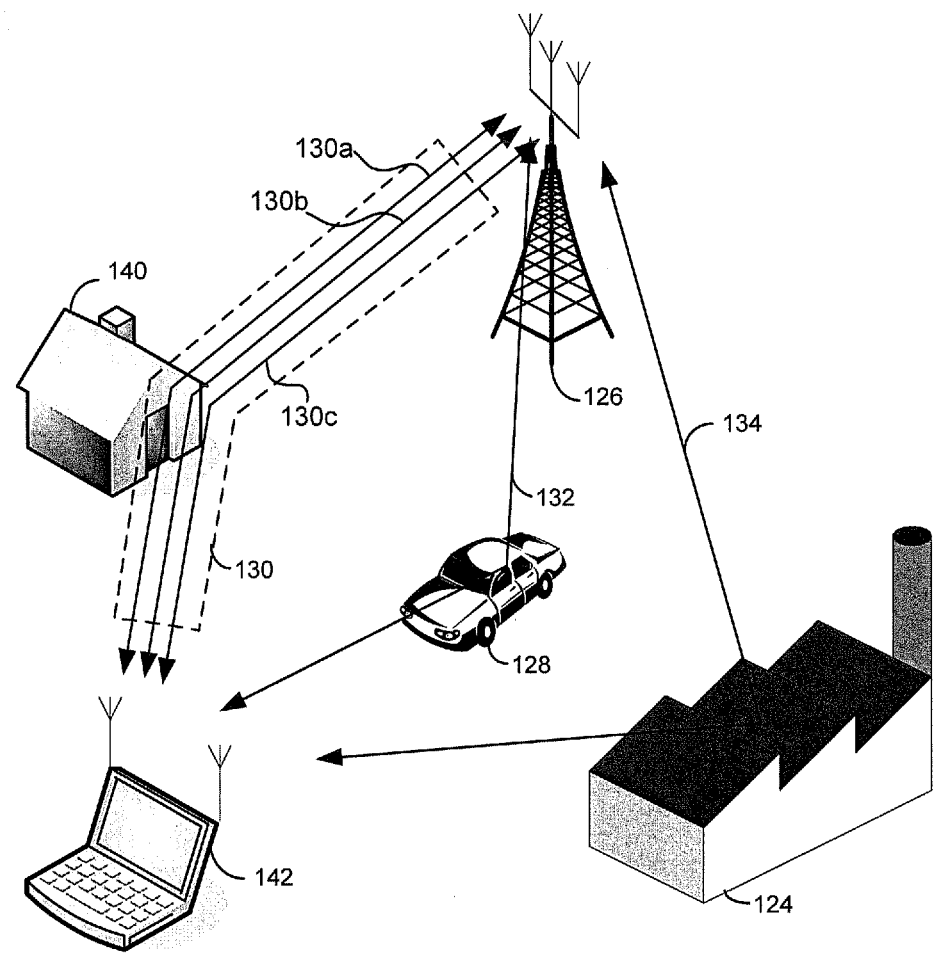
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a building 140 such as a home or office, a user equipment (UE) 142 (which may also be referred to as a mobile terminal) 142, a factory 124, a base station 126, a car 128, and High Speed Packet Access (HSPA) communication paths 130, 132 and 134. The HSPA communication paths 130, 132, and 134 may comprise one or more physical channels, for example an Enhanced Relative Grant Channel (E-RGCH) 130a, a Hybrid ARQ Indicator Channel (E-HICH) 130b, and an Enhanced Dedicated Channel (E-DCH) 130c, as illustrated for HSPA communication path 130.

The base station 126 and the UE 142 may comprise suitable logic, circuitry and/or code that may be enabled to generate and process MIMO communication signals.

Wireless communications between the base station 126 and the UE 142 may take place over a wireless channel. The wireless channel may comprise a plurality of communication paths, for example, the communication paths 130, 132 and 134. The wireless channel may change dynamically as the UE 142 and/or the car 128 moves. In some cases, the UE 142 may be positioned so that it is in line-of-sight (LOS) of the base station 126. In other instances, there may not be a direct line-of-sight between the UE 142 and the base station 126 and the radio signals may travel as reflected communication paths between the communicating entities, as illustrated by the exemplary HSPA communication paths 130, 132 and 134. In the downlink, the HSPA communication paths may be referred to as High Speed Downlink Packet Access (HSDPA). In the uplink, the HSPA communication paths may be referred to as High Speed Uplink Packet Access (HSUPA). The radio signals may be reflected by man-made structures like the building 140, the factory 124 or the car 128, or by natural obstacles like hills. Such a system may be referred to as a non-line-of-sight (NLOS) communications system.

Signals communicated by the communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The HSPA communication paths 130, 132 and 134, for example, may arrive with different delays at the UE 142. The HSPA communication paths 130, 132 and 134 may also be differently attenuated. In the downlink, for example, the received signal at the UE 142 may be the sum of differently attenuated HSPA communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the UE 142, in particular for NLOS communication systems. Furthermore, Orthogonal Frequency Division Multiplexing (OFDM) systems may be suitable for wireless systems with multipath. To enable a communication receiver to decode data, and to deal with multipath propagation, for example via interference cancellation protocols, timing may be established with respect to the received signal, in particular frame timing, and slot timing. Further technologies to enhance data rates in mobile communication systems may comprise Enhanced Uplink and Enhanced Downlink technology, which may employ link adaptation technology, for example. The HSPA communication paths 130, 132, and/or 134 may be, in the uplink, HSUPA channels, for example. HSUPA channels may be characterized by high data rate transfers, and high-order modulation schemes, requiring relatively high signal-to-noise-and-interference ratios (SINRs). Thus, it may be desirable that HSUPA channels may be highly adaptive to varying channel conditions, and may utilize various techniques in order to exploit channel diversity, as described above.

Figure 1B:
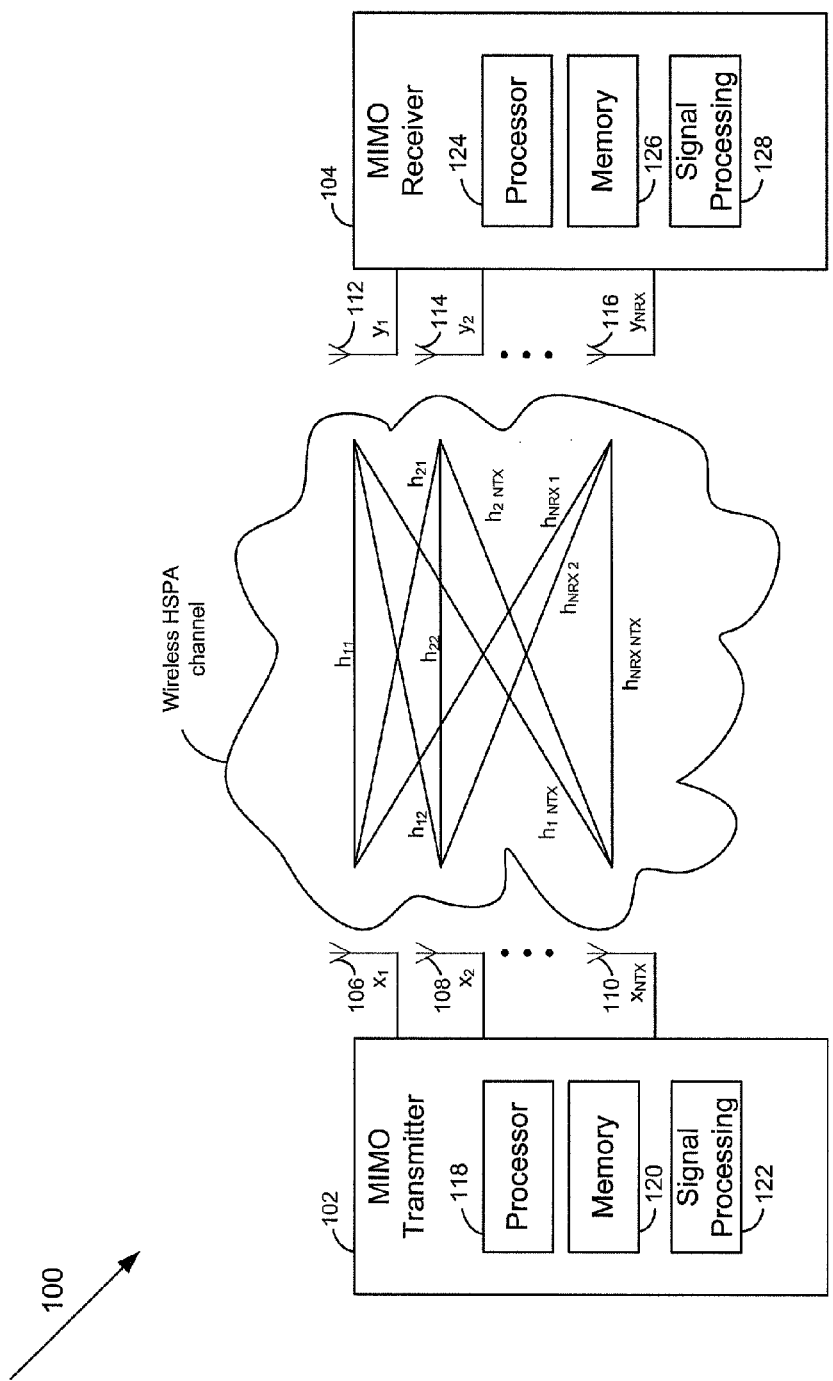
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a High Speed Packet Access (HSPA) system 100, MIMO transmitter 102 and a MIMO receiver 104, and antennas 106, 108, 110, 112, 114 and 116. The MIMO transmitter 102 may comprise a processor module 118, a memory module 120, and a signal processing module 122. The MIMO receiver 104 may comprise a processor module 124, a memory module 126, and a signal processing module 128. There is also shown a wireless HSPA channel comprising communication paths $h_{11}$, $h_{12}$, $h_{22}$, $h_{21}$, $h_{2\ NTX}$, $h_{1\ NTX}$, $h_{NRX\ 1}$, $h_{NRX\ 2}$, $h_{NRX\ NTX}$, where $h_{mn}$ may represent a channel coefficient from transmit antenna n to receiver antenna m. There may be $N_{Tx}$ transmitter antennas and $N_{RX}$ receiver antennas. There is also shown transmit symbols $x_1$, $x_2$ and $X_{NTX}$, and receive symbols $y_1$, $y_2$ and $y_{NRX}$. An HSPA system 100 may comprise HSDPA channels in the downlink, and HSUPA channels in the uplink.

The MIMO transmitter 102 may comprise suitable logic, circuitry and/or code that may be enabled to generate transmit symbols $x_I$ i∈{1, 2, . . . $N_{TX}$} that may be transmitted by the transmit antennas, of which the antennas 106, 108 and 110 may be depicted in FIG. 1B. The processor module 118 may comprise suitable logic, circuitry, and/or code that may be enabled to process signals. The memory module 120 may comprise suitable logic, circuitry, and/or code that may be enabled to store and/or retrieve information for processing in the MIMO transmitter 102. The signal processing module 122 may comprise suitable logic, circuitry and/or code that may be enabled to process signals, for example in accordance with one or more MIMO transmission protocols.

The MIMO receiver 104 may comprise suitable logic, circuitry and/or code that may be enabled to process the receive symbols $y_I$ i∈{1, 2, . . . $N_{RX}$} that may be received by the receive antennas, of which the antennas 112, 114 and 116 may be shown in FIG. 1B. The processor module 124 may comprise suitable logic, circuitry, and/or code that may be enabled to process signals. The memory module 126 may comprise suitable logic, circuitry, and/or code that may be enabled to store and/or retrieve information for processing in the MIMO receiver 104. The signal processing module 128 may comprise suitable logic, circuitry and/or code that may be enabled to process signals, for example in accordance with one or more MIMO protocols. An input-output relationship between the transmitted and the received signal in a MIMO system may be specified as:

$$y = Hx + n$$

where $y=[y_1, y_2, \ldots y_{NRX}]^T$ may be a column vector with $N_{RX}$ elements, $.^T$ may denote a vector transpose, $H=[h_{ij}]$: i∈{1, 2, . . . $N_{RX}$}; j∈{1, 2, . . . $N_{TX}$} may be a channel matrix of dimensions $N_{RX}$ by $N_{TX}$, $x=[x_1, x_2, \ldots x_{NTX}]^T$ is a column vector with $N_{TX}$ elements and n is a column vector of noise samples with $N_{RX}$ elements.

The system diagram in FIG. 1B may illustrate an exemplary multi-antenna system as it may be utilized in a Universal Mobile Telecommunication System (UMTS) Evolved Universal Terrestrial Radio Access (EUTRA) or Long-Term Evolution (LTE) system. Over each of the $N_{TX}$ transmit antennas, a symbol stream, for example $x_1(t)$ over antenna 106, may be transmitted. A symbol stream, for example $x_1(t)$, may comprise one or more symbols, wherein each symbol may be modulated onto a different sub-carrier. OFDM systems may generally use a relatively large number of subcarriers in parallel, for each symbol stream. For example, a symbol stream $x_1(t)$ may comprise symbols on carriers $f_m$: $m \in \{1, 2, \ldots M\}$, and M may be a subset of the FFT size that may be utilized at the receiver. For instance, with FFT sizes of N, N>M and may create guard-tones that may allow utilization of variable bandwidth when deployed, for example, 64, 128, or 512 sub-carriers. The M sub-carriers may comprise a symbol stream $x_1(t)$, for example, that may occupy a bandwidth of a few kilohertz to a few megahertz.

Common bandwidth may be between 1 MHz and up to 100 MHz, for example. Thus, each symbol stream may comprise one or more sub-carriers, and for each sub-carrier a wireless HSPA channel may comprise multiple transmission paths. For example, a wireless HSPA channel $h_{12}$ from transmit antenna 108 to receive antenna 112, as illustrated in the figure, may be multi-dimensional. In particular, the wireless HSPA channel $h_{12}$ may comprise a temporal impulse response, comprising one or more multipath components. The wireless HSPA channel $h_{12}$ may also comprise a different temporal impulse response for each sub-carrier $f_m$ of the symbol stream, for example $x_2(t)$. The wireless HSPA channels as illustrated in FIG. 1B depicts a spatial dimension of the wireless HSPA channel because the transmitted signal from each transmit antenna may be received differently at each receiver antenna. Thus, a channel impulse response may be measured and/or estimated for each sub-carrier.

To enable decoding of data, and channel estimation, frame timing may be acquired in accordance with various embodiments of the invention. The transmission of small transmission entities, for example bits, may be arranged into larger units consisting of several consecutive bits, and/or symbols. These larger units may be slots, and multiple consecutive slots may be referred to as a frame. To enable data reception, both slot and frame timing may be determined at the receiver.

In accordance with various embodiments of the invention, a method and system for detecting enhanced relative grants in wireless communication systems may be implemented in an uplink of a High-Speed Packet access (HSPA) system 100, which may be also be referred to as Enhanced Uplink. HSUPA may be utilizing link adaptation methods, and the invention may utilize single or multiple antennas at a transmitter and/or receiver, in accordance with various embodiments of the invention. HSUPA may comprise several physical layer channels, for example an Enhanced Relative Grant Channel (E-RGCH 130*a*), and an a Hybrid ARQ Indicator Channel (E-HICH 130*b*) for an Enhanced Dedicated Channel (E-DCH 130*c*).

An E-RGCH 130*a*, for example, may be a dedicated channel that the base station (BS) may use to send relative grants to a UE 142 (user equipment, or mobile station). A relative grant, may determine a data rate limit for a communication channel, with regard to some known data rate. In some instances, there may be three possible relative grants from a serving BS to a mobile station: UP/HOLD/DOWN. The BS may use these commands to increase/hold/decrease grants of data rates to a UE 142, which may be used for transmitting data to a BS on an uplink E-DPDCH (enhanced dedicated packet data channel).

An E-HICH 130*b*, for example, may be a dedicated channel that the BS may use to send Hybrid Automatic Repeat-reQuests (HARQ) indicators to a UE 142. There may be three messages from the serving BS: ACK/DTX/NACK (referring to Acknowledgement, Discontinuous transmission, Negative Acknowledgement, respectively). The BS may use these commands to inform a UE 142 about the receipt of associated previously transmitted data frames. In particular, the HARQ indicators may be based on Cyclic Redundancy Checks (CRCs).

The E-RGCH 130*a* and E-HICH 130*b* associated with a given user and/or communication may both use the same Orthogonal Variable Spreading Factor (OVSF) code for spreading at the base station. The E-RGGH and E-HICH 130*b* may be distinguished by different signature indices assigned to them. Since both channels may share the same OVSF code, the OVSF code power over the total cell power may be identical for E-RGCH 130*a* and E-HICH 130*b*. In some instances, a digital gain factors may be applied on a E-RGCH 130*a* and/or a E-HICH 130*b* before OVSF code spreading may be performed. The gain factors for E-RGCH 130*a* and for E-HICH 130*b* may or may not be identical. In some instances, gain factors may be determined from within a range, for example based on network tests and/or interoperability tests.

Figure 2:
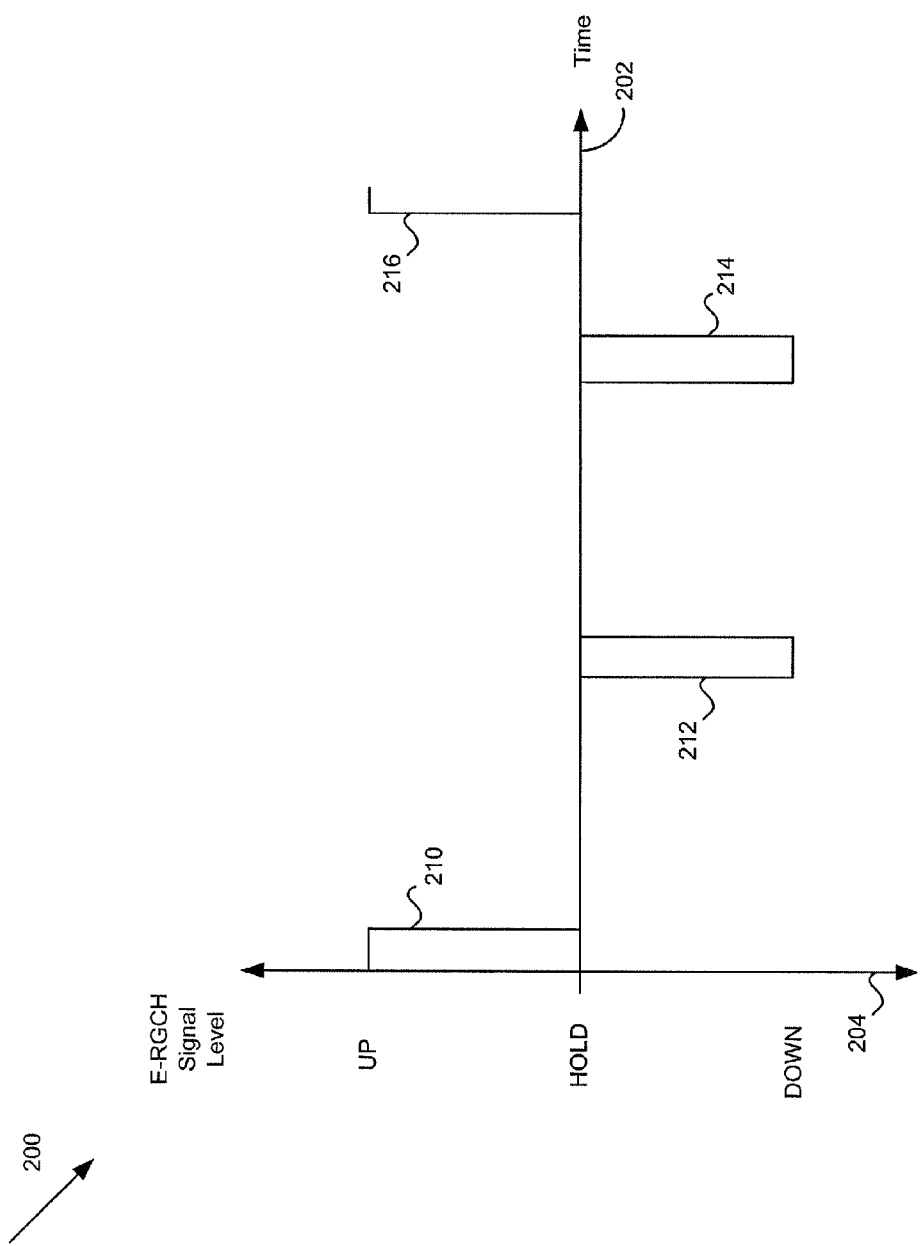
FIG. 2 is a diagram that illustrates an exemplary E-RGCH 130a signal, in accordance with various embodiments of the invention.

FIG. 2 is a diagram that illustrates an exemplary E-RGCH 130*a* signal, in accordance with various embodiments of the invention. Referring to FIG. 2, there is shown a signal level illustration 200, comprising a time axis 202, an E-RGCH 130*a* signal level axis 204, UP signals 210 and 216, and DOWN signals 212 and 214. There is also indicated a HOLD level.

The E-RGCH 130*a* and E-HICH 130*b* from a particular cell/base station in a serving Radio Link Set (RLS) may share the same frame timing, and the same frame size. In order to detect E-RGCH 130*a* signals reliably, the UE 142 may improve signal detection accuracy. An E-RGCH 130*a* signal comprising UP/HOLD/DOWN levels may be ternary, for example, and in some instances, the UP and DOWN signal levels may be symmetrically arranged around the HOLD level. This is illustrated in FIG. 2, where the UP level and DOWN levels are symmetrical with respect to the HOLD level. A HOLD level signal may indicate that a data rate granted may be held, that is, a user may not send at higher data rates than previously granted. In instances when the data rate granted changes, for example due to changing channel conditions, a relative grant signal may be sent, indicating whether the data rate grant my be increased (UP) or decreased (DOWN) relative to the previous data rate grant level (to maintain, HOLD). For example, after an UP signal 210, the E-RGCH 130*a* may remain at HOLD, until a DOWN signal 212 may be transmitted, indicating that the granted data rate may be reduced. Some time later, for example, channel conditions may deteriorate further, and a DOWN signal 214 my further reduce the granted data rate. In accordance with various embodiments of the invention, in many instances, the E-RGCH 130*a* signal may remain at the HOLD signal level for most of the time. Hence, by setting the HOLD level at zero, for example, the absence of a signal significantly different from zero may be considered a HOLD signal level.

Due to changing or varying channel conditions comprising attenuation and noise, for example, the receiver may not know at what levels the UP/HOLD/DOWN levels may be situated, and may thus be at a certain risk to detect a wrong E-RGCH 130*a* signal. Because a wrong detection of a UP signal may reduce the assumed signal-to-noise margin too much for the true channel conditions, excessively bad communications may result, which may require retransmissions, for example. Conversely, if a wrong DOWN signal may be detected, the data rate may be lowered beyond the data rates supported for a given quality of service, and thus the communication may be inefficient. In some instances, the problem may be further compounded if no error coding is used on the E-RGCH 130*a* signal.

Figure 3:
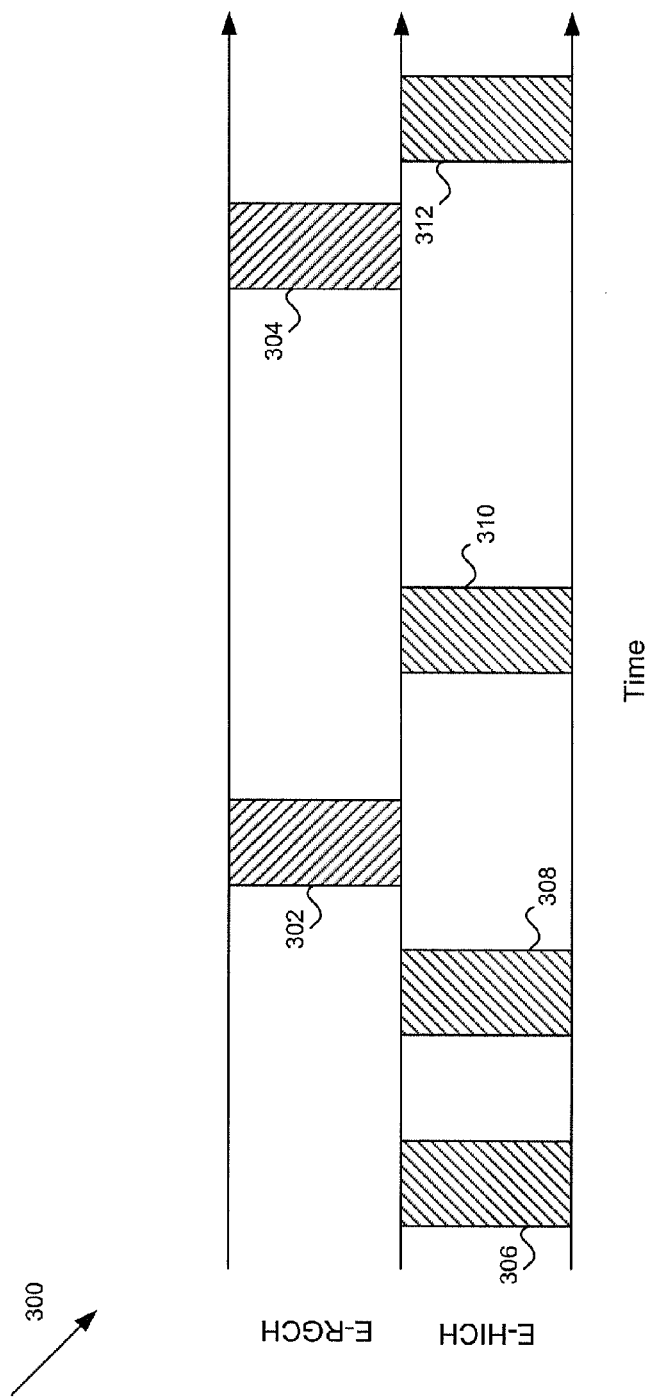
FIG. 3 is a diagram that illustrates an exemplary transmission signal schedule for E-HICH 130b and E-RGCH 130a, in accordance with an embodiment of the invention.

FIG. 3 is a diagram that illustrates an exemplary transmission signal schedule for E-HICH 130b and E-RGCH 130a, in accordance with an embodiment of the invention. Referring to FIG. 3, there is shown a signal schedule 300, comprising E-RGCH 130a signals 302 and 304, and E-HICH 130b signals 306, 308, 310, and 312. There is also shown a time axis.

The E-HICH 130b may be a downlink dedicated physical channel that may carry binary hybrid ARQ acknowledgments to inform the UE 142 about quality of detection of the E-DCH 130c at the base station. When no transmission is detected, the E-HICH 130b may not transmit any data, for example to conserve energy. The E-HICH 130b may have allocated Transmission Time Intervals (TTIs) in which it may transmit, and which may be known to the receiving UE 142. The timing of the E-HICH 130b may, for example, depend on the downlink DPCH timing. The E-RGCH 130a and E-HICH 130b may share a similar structure and may use a same channelization code and scrambling code, in accordance with various embodiments of the invention. In accordance with various embodiments of the invention, the E-HICH 130b and E-RGCH 130a may share a common OVSF code. The E-RGCH 130a transmissions may not be scheduled, for example. Since the E-HICH 130b and the E-RGCH 130a may use the same OVSF, it may be desirable to measure the power level in time slots allocated to the E-HICH 130b, when the E-HICH 130b may not be transmitting. Furthermore, since the E-RGCH 130a may be at the HOLD level most frequently, the absence of an E-HICH 130b signal may be used to estimate the signal level of the E-RGCH 130a HOLD level. In these instances, the measured (and, for example, averaged) signal-and-noise power level, may be associated with the E-RGCH 130a HOLD level, which in turn may be used to estimate the levels of the UP and DOWN E-RGCH 130a signals.

Figure 4:
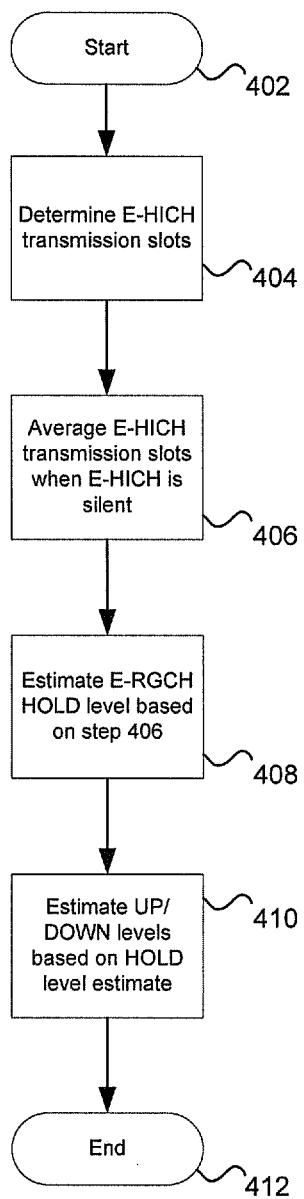
FIG. 4 is a flow chart illustrating an exemplary signal level estimation for the E-RGCH 130a, in accordance with an embodiment of the invention.

FIG. 4 is a flow chart illustrating exemplary signal level estimation for the E-RGCH 130a, in accordance with an embodiment of the invention. The estimation process may commence in step 402. It may be desirable to determine the TTIs in which the E-HICH 130b may be scheduled to transmit in step 404. This information may be available via various parameters obtainable from communication setup information relayed from the base station 126 to the UE 142. In step 406, the UE 142 receiver may estimate the signal level over a plurality of TTIs which may be available for the E-HICH 130b to transmit in, but the E-HICH 130b may not transmit. In step 408, because the E-RGCH 130a may be at HOLD most of the time, the estimate of the signal power in the E-HICH 130b TTIs, may approximate the HOLD level of the E-RGCH 130a. In step 410, the signal levels for the UP and DOWN signals in the E-RGCH 130a may be estimated. This estimation may be based on information about the transmission signal, for example,. that the UP and DOWN signal levels may be symmetrical around the HOLD level, and/or suitable threshold for detection may be determined based on received signal statistics, for example, the variance of the noise signals used to estimate the HOLD signal level. The estimation process may terminate in step 412.

Figure 5:
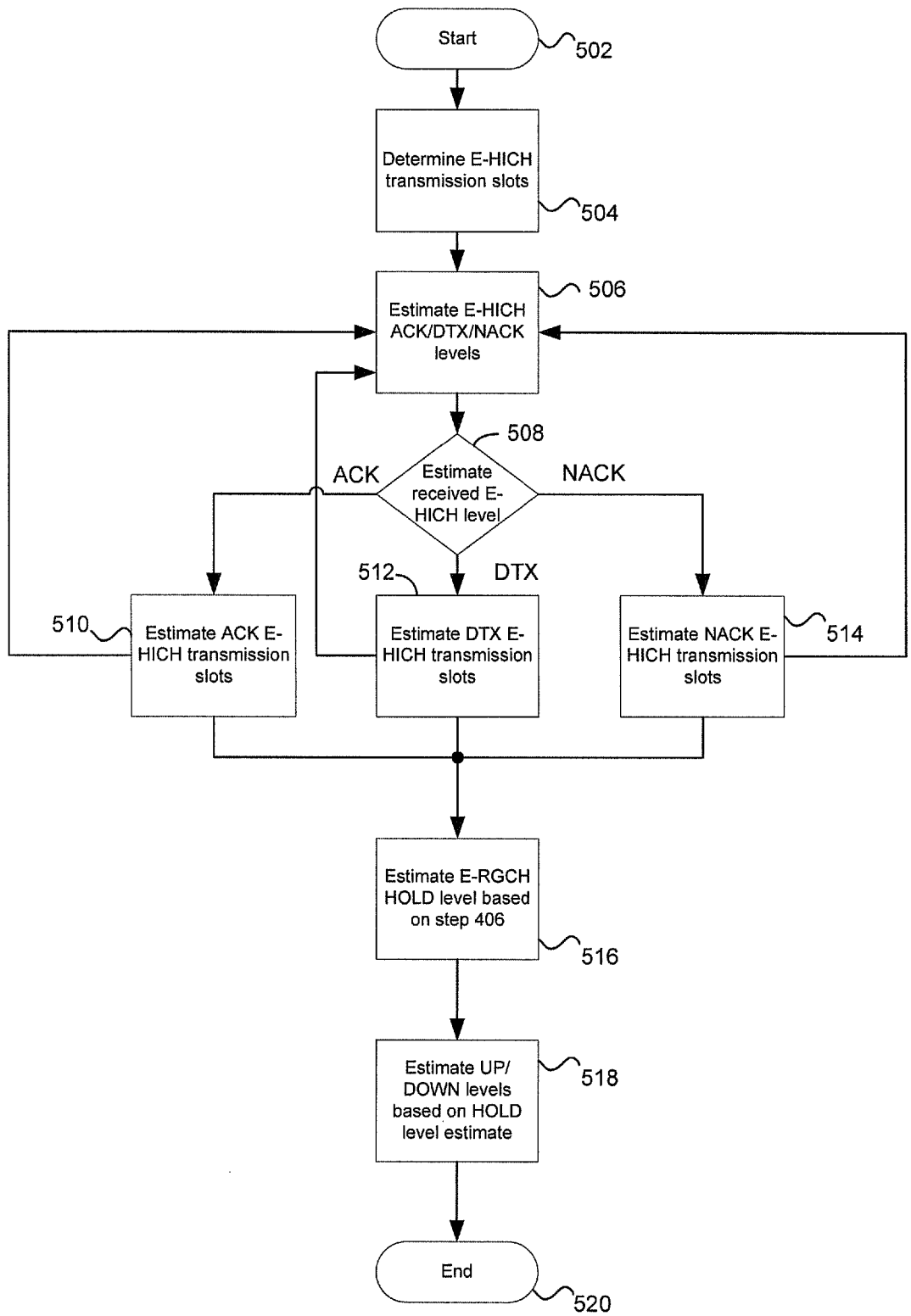
FIG. 5 is a flow chart illustrating an exemplary E-RGCH 130a signal level estimation, in accordance with an embodiment of the invention.

FIG. 5 is a flow chart illustrating an exemplary E-RGCH 130a signal level estimation, in accordance with an embodiment of the invention. The estimation process may commence in step 502. In step 504, the TTIs in which the E-HICH 130b may be scheduled to transmit may be determined. This information may be available via various parameters obtainable from communication setup information relayed from the base station 126 to the UE 142. In step 506, the E-HICH 130b levels may be estimated. The E-HICH 130b signal may be ternary comprising, for example, ACK, DTX, and NACK. The different signal power levels for ACK, DTX, and NACK may be estimated on previous estimates obtained from steps 510, 512, and 514, and/or from the presently received E-HICH 130b signal directly. In step 508, based on the estimates for the E-HICH 130b signal levels obtained in step 506, a received E-HICH 130b signal level may be determined to be an ACK, DTX, or NACK signal. When the E-HICH 130b signal may be an ACK signal, in step 510, a new estimate for the ACK level may be obtained, for example by averaging with previously received ACK signals. Similarly, if a DTX or a NACK signal may have been received, the DTX or NACK signal level estimates, respectively, may be updated in steps 512 and 514. In accordance with various embodiments of the invention, the estimates for the ACK, DTX, and/or NACK signal levels for the E-HICH 130b signal may be fed back to step 506.

In step 516, because the E-RGCH 130a may be at HOLD most of the time, the estimate of the signal power in the E-HICH 130b TTIs, may approximate the HOLD level of the E-RGCH 130a, offset by the power level due to the E-HICH 130b signal level ACK, DTX, or NACK, respectively. By correcting for the E-HICH 130b offset appropriately, the E-HICH 130b measurements over a plurality of TTIs may be combined to estimate the HOLD level of the E-RGCH 130a. In step 518, the signal levels for the UP and DOWN signals in the E-RGCH 130a may be estimated. This estimation may be based on information about the transmission signal, for example that the UP and DOWN signal levels may be symmetrical around the HOLD level, and/or suitable threshold for detection may be determined based on received signal statistics, for example, the variance of the noise signals used to estimate the HOLD signal level. The estimation process may terminate in step 520.

In accordance with an embodiment of the invention, a method and system for detecting enhanced relative grants in a wireless communications system may comprise measuring a signal power level of an Enhanced Hybrid ARQ Indicator Channel (E-HICH 130b) and estimating a HOLD signal level of an Enhanced Dedicated Channel (E-DCH 130c) Relative Grant Channel (E-RGCH 130a), based on the measured E-HICH 130b signal power level, wherein the E-RGCH 130a is associated with the E-HICH 130b, as illustrated in FIG. 4 and FIG. 5, for example.

The signal power level of the E-HICH 130b in Transmission Time Intervals (TTIs) associated with the E-HICH 130b may be measured. As illustrated in FIG. 5, The HOLD signal level may be measured by compensating the measured signal power level of the E-HICH 130b based on whether the E-HICH 130b signal comprises an acknowledgment (ACK), a discontinuous transmission (DTX), or a negative acknowledgment (NACK). The measured signal power level may be compensated by an offset. An UP signal level of the E-RGCH 130a signal may be estimated based on the estimated HOLD signal level, for example as shown in step 516 in FIG. 5. A DOWN signal level of the E-RGCH 130a signal may be estimated based on the estimated HOLD signal level, for example in step 518. The communication signals may be High Speed Uplink Packet Access signals, as illustrated in FIG. 1A. The E-HICH 130b and the E-EGRCH 130a may use the same Orthogonal Variable Spreading Factor (OVSF) code. A plurality of E-HICH 130b measurements may be averaged for the measurement of the signal power level of the E-HICH 130b. The plurality of E-HICH 130b measurements may be obtained in Transmission Time Intervals (TTIs) associated with the E-HICH 130b.

Another embodiment of the invention may provide a machine-readable and/or computer-readable storage and/or medium, having stored thereon, a machine code and/or a computer program having at least one code section executable by a machine and/or a computer, thereby causing the machine and/or computer to perform the steps as described herein for detecting enhanced relative grants in a wireless communications system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, comprising:
   determining, by a mobile terminal, a Transmission Time Interval (TTI) from among a plurality of TTIs in which an Enhanced Hybrid ARQ Indicator Channel (E-HICH) is scheduled to transmit;
   measuring, by the mobile terminal, a signal power level of the E-HICH over the determined TTI;
   comparing, by the mobile terminal, the measured signal power level of the E-HICH with a previous estimated signal power level, the previously estimated signal power level corresponding to a previously estimated power level of an acknowledgment (ACK), a previously estimated power level of a discontinuous transmission (DTX), or a previously estimated power level of a negative acknowledgment (NACK), to determine whether the E-HICH includes the ACK, the DTX, or the NACK;
   updating, by the mobile terminal, the a previously estimated power level of the ACK, the previously estimated power level of the DTX, or the previously estimated power level of the NACK with the measured signal power level based upon whether the E-HICH includes the ACK, the DTX, or the NACK; and
   determining, by the mobile terminal, an estimated HOLD signal level of an Enhanced Dedicated Channel (E-DCH) Relative Grant Channel (E-RGCH) by compensating the measured E-HICH signal power level by an offset corresponding to the ACK, the DTX, or the NACK.

2. The method according to claim 1, wherein the measuring, comprises:
   measuring the signal power level of the E-HICH in the plurality of TTIs that are associated with the E-HICH.

3. The method according to claim 1, further comprising:
   estimating an UP signal level of the E-RGCH based on the estimated HOLD signal level.

4. The method according to claim 1, further comprising:
   estimating a DOWN signal level of the E-RGCH based on the estimated HOLD signal level.

5. The method according to claim 1, wherein the communication signals are High Speed Uplink Packet Access signals.

6. The method according to claim 1, further comprising:
   using a same Orthogonal Variable Spreading Factor (OVSF) code for the E-HICH and the E-RGCH.

7. The method according to claim 1, further comprising:
   repeating measuring the signal power level, comparing the measured signal power level, updating the previously estimated power level, and determining the estimated HOLD signal level for another TTI from among the plurality of TTIs to determine a second estimated HOLD signal level; and
   averaging the estimated HOLD signal level and the second estimated HOLD signal level.

8. A mobile terminal for processing communication signals, comprising:
   a memory module configured to store a plurality of previously estimated signal power levels that correspond to a previously estimated power level of acknowledgment (ACK), a previously estimated power level of a discontinuous transmission (DTX), or a previously estimated power level of a negative acknowledgment (NACK); and
   a processor configured to:
      determine a Transmission Time Interval (TTI) from among plurality of TTIs in which an Enhanced Hybrid ARQ Indicator Channel (E-HICH) is scheduled to transmit;
      measure a signal power level of the E-HICH over the determined TTI;
      compare the measured signal power level of the E-HICH with the previously estimated power level of the ACK, the previously estimated power level of the DTX, or the previously estimated power level of the NACK to determine whether the E-HICH includes the ACK, the DTX, or the NACK;
      update the previously estimated power level of the ACK, the previously estimated power level of the DTX, or the previously estimated power level of the NACK stored in the memory module with the measured signal power level based upon whether the E-HICH includes the ACK, the DTX, or the NACK; and
      determine an estimated HOLD signal level of an Enhanced Dedicated Channel (E-DCH) Relative Grant Channel (E-RGCH) by compensating the measured E-HICH signal power level by an offset corresponding to the ACK, the DTX, or the NACK.

9. The mobile terminal according to claim 8, wherein the processor is configured to measure the signal power level of the E-HICH in TTIs associated with the E-HICH.

10. The mobile terminal according to claim 8, wherein the processor is further configured to estimate an UP signal level of the E-RGCH based on the estimated HOLD signal level.

11. The mobile terminal according to claim 8, wherein the processor is further configured to estimate a DOWN signal level of the E-RGCH based on the estimated HOLD signal level.

12. The mobile terminal according to claim 8, wherein the communication signals are High Speed Uplink Packet Access signals.

13. The mobile terminal according to claim 8, wherein the E-HICH and the E-RGCH use a same Orthogonal Variable Spreading Factor (OVSF) code.

14. The mobile terminal according to claim 8, wherein the processor is further configured to:
repeat measuring the signal power level, comparing the measured signal power level, updating the previously estimated power level, and determining the estimated HOLD signal level for another TTI from among the plurality of TTIs to determine a second estimated HOLD signal level; and
average the estimated HOLD signal level and the second estimated HOLD signal level.

15. A mobile terminal for processing communication signals, comprising:
a memory module configured to store a plurality of previously estimated signal power levels that correspond to a previously estimated power level of an acknowledgment (ACK), a previously estimated power level of a discontinuous transmission (DTX), or a previously estimated power level of a negative acknowledgment (NACK); and
a processor configured to:
measure a signal power level of an indicator channel;
compare the measured signal power level of the indicator channel with the previously estimated power level of the ACK, the previously estimated power level of the DTX, or the previously estimated power level of the NACK to determine whether the indicator channel includes the ACK, the DTX, or the NACK;
update the previously estimated power level of the ACK, the previously estimated power level of the DTX, or the previously estimated power level of the NACK stored in the memory module with the measured signal power level based upon whether the E-HICH includes the ACK, the DTX, or the NACK; and
determine an estimated HOLD signal level of a scheduling channel by compensating the measured indicator channel signal power level by an offset corresponding to the ACK, the DTX, or the NACK.

16. The mobile terminal according to claim 15, wherein the indicator channel is an Enhanced Hybrid ARQ Indicator Channel (E-HICH).

17. The mobile terminal according to claim 15, wherein the scheduling channel is an Enhanced Dedicated Channel (E-DCH) Relative Grant Channel (E-RGCH).

18. The mobile terminal of claim 15, wherein the processor is further configured to estimate an UP signal level of the scheduling channel based on the estimated HOLD signal level.

19. The mobile terminal of claim 15, wherein the processor is further configured to estimate a DOWN signal level of the scheduling channel based on the estimated HOLD signal level.

20. The mobile terminal according to claim 15, wherein the processor is further configured to:
determine a Transmission Time Interval (TTI) from among a plurality of TTIs in which the indicator channel is scheduled to transmit,
repeat measuring the signal power level, comparing the measured signal power level, updating the previously estimated power level, and determining the estimated HOLD signal level for another TTI from among the plurality of TTIs to determine a second estimated HOLD signal level, and
average the estimated HOLD signal level and the second estimated HOLD signal level.

* * * * *

UNITED STATES PATENT AND TRADEMARK OFFICE
CERTIFICATE OF CORRECTION

PATENT NO. : 9,118,475 B2  
APPLICATION NO. : 12/615741  
DATED : August 25, 2015  
INVENTOR(S) : Jamie Menjay Lin Page 1 of 1

It is certified that error appears in the above-identified patent and that said Letters Patent is hereby corrected as shown below:

IN THE CLAIMS

Column 9, line 51, please replace "a previous estimated" with --a previously estimated--.

Column 9, line 59, please replace "the a previously" with --the previously--.

Column 10, line 34, please replace "of acknowledgment" with --of an acknowledgement--.

Signed and Sealed this  
Twenty-second Day of March, 2016

Michelle K. Lee  
*Director of the United States Patent and Trademark Office*